US006151620A

United States Patent [19]
Madsen et al.

[11] Patent Number: 6,151,620
[45] Date of Patent: Nov. 21, 2000

[54] CONFERENCE MESSAGING SYSTEM

[75] Inventors: Harold J. Madsen, Orem; Russell Lundberg, Manti; Michael A. Allred, Lehi, all of Utah

[73] Assignee: Novell, Inc., Provo, Utah

[21] Appl. No.: 08/956,145

[22] Filed: Oct. 22, 1997

[51] Int. Cl.[7] .................................................. G06F 13/00
[52] U.S. Cl. ............................ 709/204; 345/330; 717/11
[58] Field of Search .................................. 709/217, 204; 395/712; 717/11; 345/330

[56] References Cited

U.S. PATENT DOCUMENTS

| | | | |
|---|---|---|---|
| 4,816,989 | 3/1989 | Finn et al. | 709/248 |
| 5,317,752 | 5/1994 | Jewett et al. | 714/14 |
| 5,432,934 | 7/1995 | Levin et al. | 713/200 |
| 5,555,416 | 9/1996 | Owens et al. | 717/11 |
| 5,621,662 | 4/1997 | Humphries et al. | 700/276 |
| 5,740,365 | 4/1998 | Pfeiffer et al. | 709/223 |
| 5,794,032 | 8/1998 | Leyda | 713/2 |
| 5,845,077 | 12/1998 | Fawcett | 709/221 |
| 5,909,581 | 6/1999 | Park | 717/11 |
| 5,919,247 | 7/1999 | Van Hoff et al. | 709/217 |

OTHER PUBLICATIONS

Ken Arnold et al., The Java™ Programming Language, (1996), pp. 247–251.
Dong–Joo Park, "Mermaid", Dec. 5, 1995.
Stephen C. Steel, "KidDesk Family Edition for Windows", (1995), Feb. 22, 1995.
"KidDesk Family Edition—Features", Edmark Corporation (1996–1997), no later than May 28, 1997.
"C2 Overview", Contec Data Systems Ltd. (1996), no later than Jun. 3, 1997.
"C2 System Management", Contec Data Systems Ltd. (1996), no later than Jun. 3, 1997.
"C2 Communications", Contec Data Systems Ltd. (1996), no later than Jun. 3, 1997.
"How Teachers Use Lancaster to Improve Teaching in the Lab", COMPanion.
Tom Brinck, "CSCW & Groupware", (1995–1997), May 23, 1997.
Michael J. Himowitz, "Netscape's New Browser Is the Best One Yet", May 26, 1997.
"Announcing CREW™" Thuridion (1996) no later than Jun. 4, 1997.
"Enterprise Solutions Limited Technical Details", Enterprise Solutions Limited (1996), no later than May 22, 1997.
Barry McMullin, "Internet Email Conference: A Brief Primer", (1995–96), Jul. 24, 1996.
"Mac Network Tool", BYTE (1994–1997), no later than Jun. 11, 1997.
"MacSUDS", Integrated Technology (Europe) Ltd. (1995), no later than Jun. 11, 1997.
Dongl–Joo Park, "CSCW Tools", Dec. 5, 1995.
"Why Use The Message Board System™ at your event?", no later than May 28, 1997.
"Features . . . ", no later than May 28, 1997.
"TMBS System Views", no later than May 28, 1997.
"Table of Contents Frame in Frameset 2", no later than May 28, 1997.

(List continued on next page.)

*Primary Examiner*—Kenneth R. Coulter
*Attorney, Agent, or Firm*—Computer Law + +

[57] ABSTRACT

A messaging system for use by inexperienced users is provided. A simple interface allows use of the messaging system without any extensive training. The system enables users to send and receive mail both within the system, and the system may be connected to a larger network configuration. The user is only permitted access to the system through the interface, thereby protecting resources such as sensitive information and administrative settings. The invention also facilitates local and/or remote system management, including the automatic downloading and installation of software updates over the network without requiring user intervention or input.

29 Claims, 6 Drawing Sheets

OTHER PUBLICATIONS

"Authorized Service Providers (ASP)", no late than May 28, 1997.

Philippe P. Piernot et al., "Designing the PenPal: Blending Hardware and Software in a User–Interface for Children", *ACM*, no later than May 28, 1997.

Wayne Rash Jr., "Groping for Groupware", *BYTE*, Apr. 1989, pp. 135, 136, 138.

Susan Hopper et al., "Real World Design in the Corporate Environment: Designing an Interface for the Technically Challenged", *Common Ground Chi 96 Conference Proceedings—Apr. 13–18, 1996*, ACM (1996), pp. 489–95.

Search Results, May 28, 1997, 11:27 AM, pp. 1–6.

Search Results, May 28, 1997, 4:34 PM, pp. 1–26.

Search Results, May 29, 1997, 11:12 AM, pp. 1–16.

Search Results, May 29, 1997, 2:40 PM, pp. 1–3.

Search Results, May 29, 1997, 5:19 PM, pp. 1–6.

"Vineyard Self–Running Demos", Data Fellows (1997), no later than Jun. 3, 1997.

Diskette—Vinedemo.exe dated Oct. 24, 1995.

Economic Forum Information.

CONFERENCE MESSAGING SYSTEM

FIELD OF THE INVENTION

The present invention relates to a system which supports computer messaging based on electronic mail services. More particularly, the invention provides a simple interface designed for a novice computer user, along with a shell program that maintains substantially exclusive control of the computer to prevent unauthorized access to system resources.

TECHNICAL BACKGROUND OF THE INVENTION

Computer technology advances have allowed computers to assist people with many traditional tasks, and have also opened new possibilities. In particular, computers have become very useful for helping people communicate with each other. "Conferencing," also known as "conference messaging" or "messaging," is a general category of communication in which computers play a vital function by obtaining, transferring, and/or displaying messages.

Known conferencing systems have important advantages. Many allow an indefinite number of participants, with messages being circulated either to each participant in turn or to all participants at once. Most conferencing systems also allow the participants to be separated by great distances, because computers and networks carry the messages between participants.

However, known systems also have disadvantages related to complexity, inadequate security, unreliability, and difficult maintenance. To better understand both the advantages and the drawbacks of known systems, we first consider examples of known systems.

Conferencing communications can be grouped into synchronous communications and asynchronous communications.

Synchronous communications are generally real-time communications in which the participants interact at about the same time. Examples include video-conferencing and Internet chat rooms, but synchronous communications also use other combinations of video, still images, voice, and/or text.

Synchronous communication systems use computers to provide users with something like face-to-face interaction. For instance, a video-conferencing system may transmit full motion video and audio using computers and a network. People at separate locations can communicate with each other almost as if they were in the same room. With synchronous voice-only communications, the computer and the connection provide capabilities similar to those of a telephone system. A chat room is a synchronous text-only application in which two or more parties can communicate with each other by exchanging written messages. A user types a message, which promptly appears on the computer screens of the chat room participants.

Even though synchronous communications are increasingly used, most computer communications are still asynchronous. The basic core of asynchronous communications is electronic mail (email). Email is a convenient method of sharing information with one or more people when delays between the creation of a message and the creation of a reply to the message matter less than delays in face-to-face communication.

Email systems are similar to the postal system in that both use a "store and forward" delivery mechanism. A message is sent from place to place, being stored at each place until it can be routed to the next place, until the message arrives at its destination address. At the destination, the message is stored until it is opened and read. A reply can then be created and sent back. The reply is likewise stored and forwarded, but it does not necessarily travel back along the same route as the original message.

More elaborate conferencing systems, such as list servers and newsgroups, build on the basic email services. Newsgroups and bulletin boards allow a group of people to actively engage in an ongoing discussion in which messages are posted intermittently over days, weeks, or longer periods. Because email is asynchronous, the participants do not have to participate at the same time, and are not expected to do so.

Unfortunately, email and other conferencing systems are not always easy to use. Some systems, whether synchronous or asynchronous, provide such an extensive set of features and options that even a user who has broad experience using computers is required to undertake large amounts of training to properly use the features provided. Obtaining the desired behavior is especially hard when it requires specific parameters and/or flags in a textual command line. Merely making an interface graphical rather than textual does not help much if users must still choose from numerous icons and menu options. Sometimes the sheer number of possible actions (either graphical or textual) is overwhelming. In addition, different commands may interact in confusing ways. A computer can be very hard to use if the behavior of a given feature changes dramatically depending on settings specified elsewhere through a "preferences" or "options" feature or a configuration file.

Feature-packed conferencing systems present users with a bewildering array of choices at both the system and application levels. Graphical user interfaces based on point-and-click technology are now dominant at both levels, making it easier for options to proliferate. Tools such as windows, program managers, menu hierarchies, help agents, wizards, and searchable indexed help files make it easier to find information about the features but also encourage the proliferation of features. The resulting complexity makes it harder to learn and use conferencing systems.

Misunderstandings caused by complex interfaces can lead to serious mistakes, such as the accidental exposure of sensitive information. The need to protect sensitive information has increased as computers become repositories or transmission conduits in conferencing systems. Many interfaces still make sensitive information too vulnerable to unauthorized access.

Even in messaging applications which provide security features, sensitive information is vulnerable to sophisticated users who have the expertise to bypass application security features by using lower-level operating system commands. For example, some system interface shell programs restrict access according to the user identification entered, such as a password. But these shells are implemented as application processes whose execution can be terminated to gain access to the underlying system services. Once the underlying system services are exposed, sensitive information stored on the computer may be read, copied, modified, or destroyed. Moreover, termination of the application may go undetected until long after the damage has been done.

In addition to the concerns noted above, maintenance is often an issue in conferencing systems. Continual increases in computing capability and wider acceptance of computers encourage the continuous development of system and application software. The result is multiple generations of software programs. Software administration may include loading and installing specific versions of software on each computer in a conferencing system. The task of maintaining current or compatible versions of software applications can become overwhelming as the number of software products and associated releases continues to increase.

Thus, it would be an advance in the art to provide a conferencing system which contains a user interface that cannot be easily avoided to gain access to underlying system commands.

It would be a further advance to provide such a conferencing system interface which requires very little training to use.

It would be an additional advance to provide a system in which software updates can be performed automatically without requiring user input. Such a conferencing system is disclosed and claimed herein.

BRIEF SUMMARY OF THE INVENTION

The present invention relates to a messaging system that incorporates a relatively simple interface and means for protecting system resources and easing administrative burdens. In one embodiment, a system according to the invention includes an interface program and a conveying program. The interface program includes a gathering program that provides a user interface which gathers messages from users and displays messages to users. The shell program maintains substantially exclusive control of the computer, thereby securing system resources from inadvertent or malicious operations. The conveying program conveys user messages between users on the same computer or on different computers.

The information entered into the gathering program includes a paired destination and data specification. The destination specifies the recipient(s) of the data. The data specification may be an actual message directly entered by the user, or it may be an identifier which indirectly identifies the location of the desired message contents. The indirect identification mechanism may be implemented using a data specification repository which contains the actual user data (the message) being conveyed, and/or pointers to copies of the data stored elsewhere. The data specification repository may be centralized on one computer or distributed over multiple computers.

The interface program also includes a shell program that gives the interface program substantially exclusive control of the computer on which it executes. This control is maintained by restricting access to the computer's resources, thereby providing security for the sensitive information stored on the computer. The shell program also initially starts the gathering program and then monitors the system to promote continuous operation of the gathering program.

The interface program also accepts various administrative commands, either locally or remotely, from a system administrator. Through the interface program, the administrator may shutdown and/or restart the computer. The interface program also transmits to a central administrative node current status information about the state of the computer.

The system also allows software updates without user intervention. The interface program and the conveying program automatically perform necessary software downloads over the network. The new software is installed when the system is not in use for messaging, to limit the inconvenience to users.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
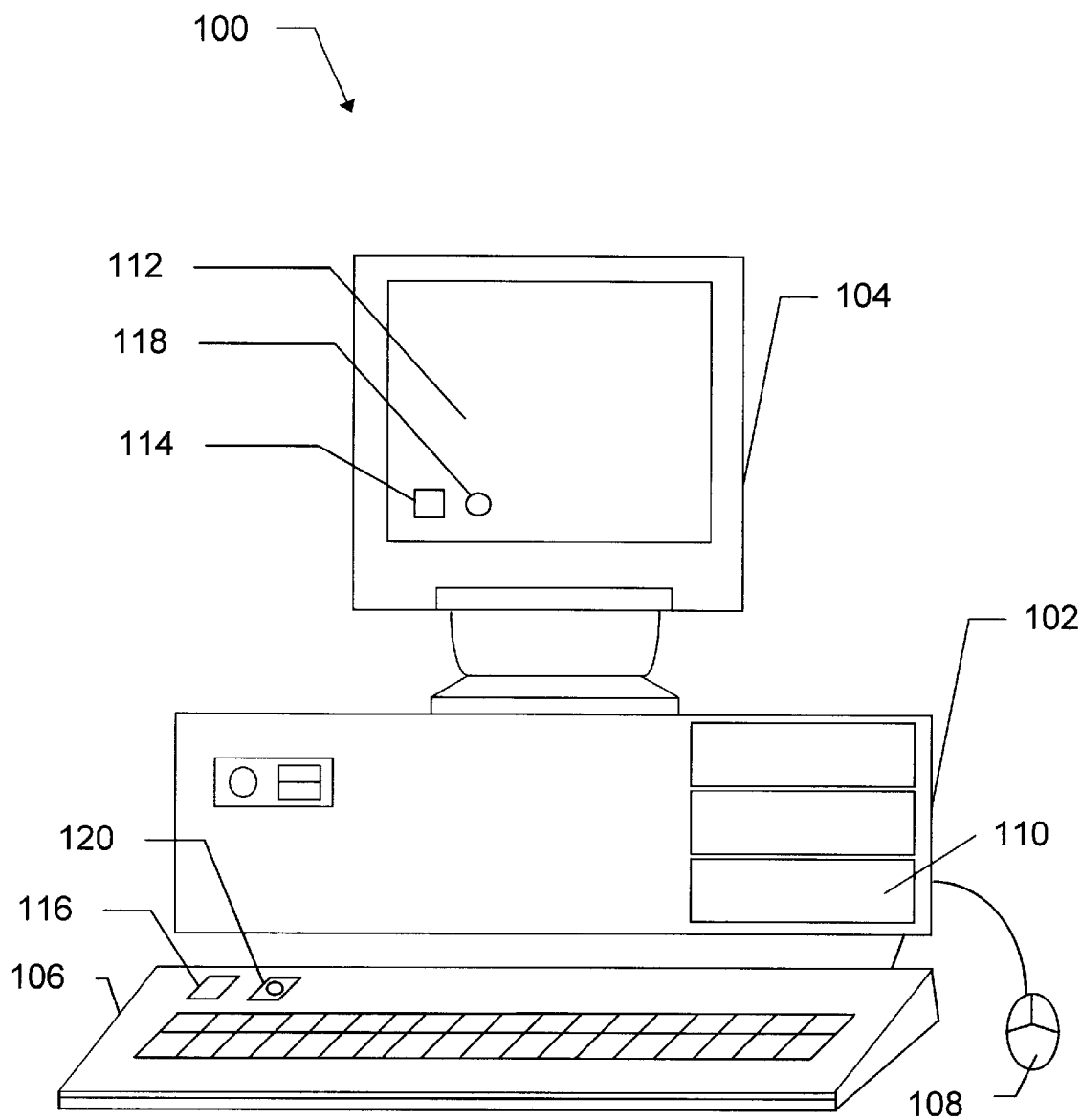
FIG. 1 is a diagram illustrating a computer which is suitable for use, either alone or as part of a network, with the present invention.

The present invention relates to a system for transferring messages using one or more computers. With reference to FIG. 1, one embodiment of a system 100 according to the present invention includes at least one computer 102. The computer 102 has a monitor 104 for displaying information and a keyboard 106 for accepting input from a user. In alternative embodiments, other input/output devices may be used. For instance, some embodiments use a touch-screen monitor 104 while others use a monitor 104 that does not accept input through finger placement on the monitor screen. Likewise, some embodiments accept voice input and/or provide audible output, while others do not. A mouse 108 is present but is preferably not required for ordinary use of the system 100. The illustrated computer 102 includes a local nonvolatile buffer 110, such as a magnetic or optical or magneto-optical disk, but other embodiments include no non-volatile local storage.

A program interface 112 displayed on the monitor 104 includes a colored button 114 which matches a colored finction key 116 on the keyboard 106. Another interface button 118 is shaped like a circle and thus matches the shape of a finction key 120. Although a circle and a colored button are shown for ease of illustration, other distinctive shapes or designs may also be used, including geometric shapes, signs recognized internationally, logos, characters, ideograms, patterns, textures, images, icons, or the like. Creating colored function keys or function keys designated by unique shapes can be easily accomplished by various methods, including replacing the keycaps or adhering stickers to existing keycaps on the keyboard 106.

The computer 102 may be a standalone machine, or it may be part of a computer network. The system 100 is but one of the many computer networked systems suited for use with the present invention. Computers which may be configured according to the invention include, without limitation, workstations, laptops, disconnectable mobile computers, departmental computers, mainframes, so-called "network computers", personal digital assistants, servers, clients, peers, uniprocessor machines, and multiprocessor machines, in a wide variety of combinations. These computers may be networked by means including local area networks, metropolitan area networks, wide area networks, the Internet, or any combination thereof. "Internet" as used herein includes variations such as a private Internet, a secure Internet, a portion of the Internet such as the World Wide Web, a value-added network, a virtual private network, an extranet, or an intranet.

Figure 2:
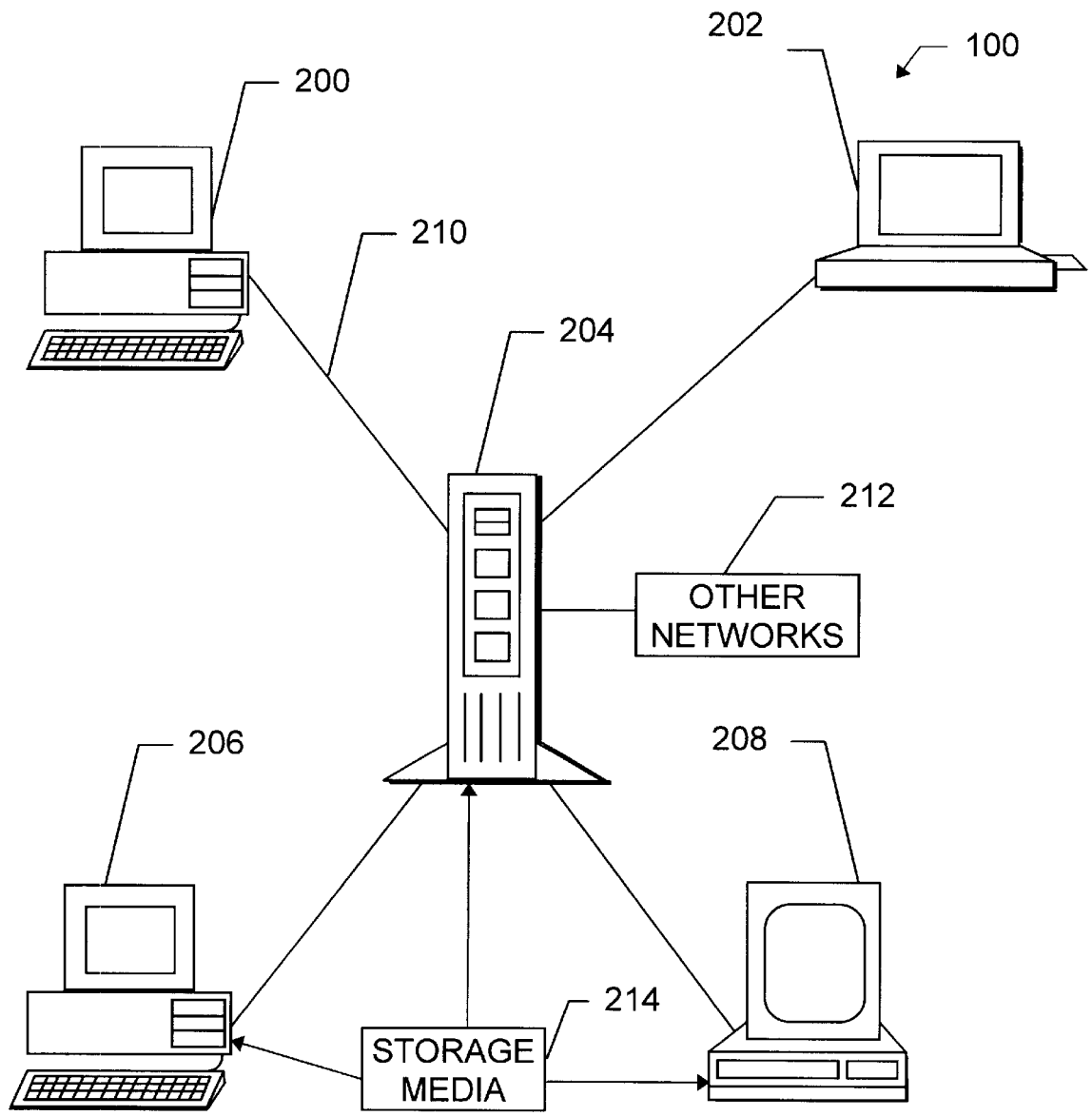
FIG. 2 is a diagram illustrating a computer network which is suitable for use with the present invention.

As further illustrated in FIG. 2, the illustrated system 100 includes five computers 200, 202, 204, 206, and 208 connected by a network, modem, or other familiar means of connectivity 210. Other networks 212 may be connected to the system 100 through a gateway or other means. The illustrated system 100 includes two desktop computers 200, 206, a disconnectable laptop 202, a multiprocessor dedicated server 204, and a scientific workstation 208. Of course, other systems configured according to the invention may contain other types of computer (such as mainframes) and may omit one or more of the illustrated types of computer. Some alternative embodiments include just one computer, while others include an arbitrary number of computers with any or all being connected by a network, modem, or other means for transferring data. The network topology shown in FIG. 2 is a "star" topology. Those of skill in the art will appreciate that the present invention also works with ring, web, tree, and other network topologies, and with combinations of various topologies.

The system 100 includes at least one computer-readable storage medium 214 having a specific physical configuration. The configuration represents data and instructions which cause computers in the system 100 to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform messaging functions according to the present invention. Suitable software for implementing the invention is readily provided by those of skill in the art using the teachings presented here and programming languages such as Java, Pascal, C++, C, assembly, firmware, microcode, and/or other languages.

Figure 3:
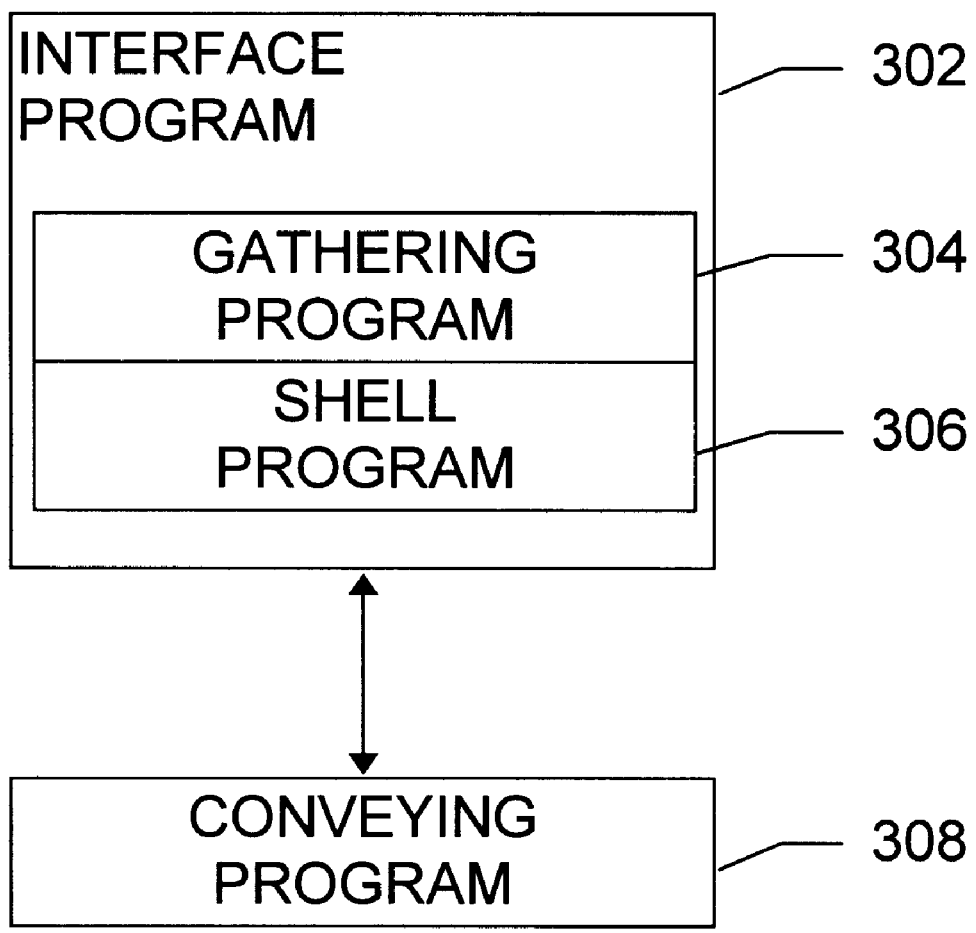
FIG. 3 is a diagram illustrating the architecture of a system of the present invention which includes an interface program and a conveying program.

FIG. 3 illustrates generally how the computers in the system 100 are configured, either with software supported by general-purpose computing hardware, or with special-purpose hardware, or with both. The configuration includes an interface program 302 containing a gathering program 304 and a shell program 306. The configuration also includes a conveying program 308 which is capable of communication with the interface program 302. As explained further below, the gathering program 304 gathers messages from users and displays messages to users, at a given site such as a particular computer. The conveying program 308 conveys user messages between sites. The shell program 306 restores undesirably terminated instances of the gathering program 304, helps in updating the gathering program 304, and provides security.

In one embodiment, an instance of the interface program 302 executes on each of the computers 200, 202, 204, 206, and 208. The shell program 306 starts the gathering program 304, which is the initial process visible and accessible to a potential user. Potential users are asked to identify themselves by logging into the system through the gathering program 304; in an alternative embodiment, login is performed using the shell 306. Possible methods of identification include entering a name and password, scanning a bar-code on an ID badge, scanning a thumb or finger print, or by other means. Standard authentication techniques may then be used to grant the user access rights based on the user's identification and on internal administrative settings.

Once the user has been identified and authenticated, the local instance of the gathering program 304 provides a user interface for conferencing. The gathering program 304 preferably presents a very simple interface which is easy to use. Depending on the user's identification and associated clearance or permissions information, the options available may include reading mail, sending mail, and/or viewing an address book.

In one embodiment, an option is designated by the colored button 114 (FIG. 1) displayed on the computer monitor 104. The button 114 matches the colored function key 116 which is pressed to actuate software for performing the selected option. In another embodiment, an option is designated by a button of a unique shape or design such as the circular design 118 which matches the design on the key 120.

One function of the gathering program 304 is to accept input from the user. In one embodiment, the input includes a paired destination and data specification. In general, the destination part of the pair specifies which other user(s) and/or archive(s) should receive a copy of the message contents. The message contents may be provided in-line in the data specification. Alternatively, the contents may be specified by identifiers in the data specification which identify the location of the desired contents by using file names, Universal Resource Locators, pointers to an earlier message, or other means. In one embodiment, certain users are restricted to specifying a single destination for each message while other users are allowed to specify one or more destinations for a given message.

Another function of the gathering program 304 is to display messages received by the interface program 302 from the conveying program 308 which are addressed to the particular user currently accessing the system 100. New messages may be designated as such and the contents may be presented to the user in various ways, including highlighting the new messages or their summaries or their subjects in red text, in blinking text, or in some other way. Those of skill in the art will appreciate that other simple and easy to use features can be incorporated to provide an interface tailored to users who are unfamiliar or uncomfortable with the complex point-and-click, nested menu, layered and otherwise complicated interfaces used in many conventional systems.

The interface program 302 sends the paired destination and data specification to the conveying program 308 for address resolution and subsequent delivery to the destination (s). The conveying program 308 may include routing, multiplexing, compression, encryption, and/or other routines familiar in the art. In one embodiment of the invention the interface program 302 and the conveying program 308 both execute on the same computer 102; in other embodiments, they reside on different computers. In either case a user can preferably send messages to other users who log into the computer in question at another time, or to users who are logged in now or later to other computers in the system 100.

Figure 4:
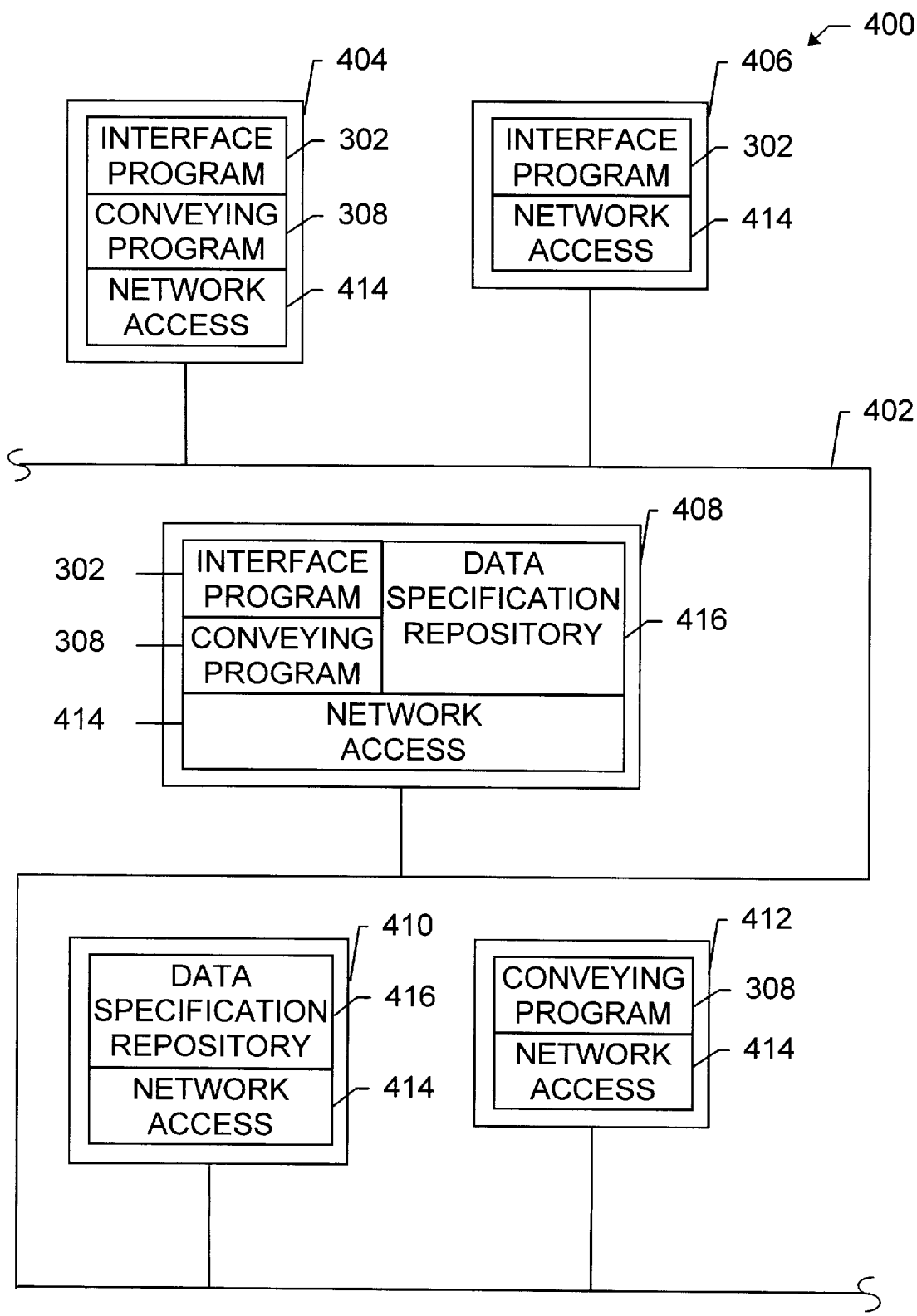
FIG. 4 is a diagram illustrating the architecture of one of many possible arrangements of the components of the present invention in computers arranged in one of the many possible network configurations.

FIG. 4 depicts another system 400 according to the invention. The system 400 includes a network 402 and five computers 404, 406, 408, 410, and 412 that are attached to the network 402. The network 402 can be any physical computer network suitable for providing data communications including, but not limited to, broadband, baseband, twisted pair, optical fiber networks, or a combination of these. Access and communication over the network 402 by each computer is facilitated by a network access module 414. The network access module 414 provides functionality comparable to the Transport, Network, Data Link, and Media Access layers of the International Standards Organization Network Model. Suitable protocols include, without limitation, NCP/IPX over Ethernet, NCP/IPX over Token Ring, SPX/IPX over Ethernet, SPX/IPX over Token Ring, TCP/IP over X.25, and TCP/IP over Ethernet. The module 414 may include a network interface card and corresponding drivers. In alternative embodiments, part or all of the module 414 functionality is provided by the conveying program 308. The network 402 may be a peer-to-peer network or a client-server network.

In one embodiment, the system 400 is dedicated to messaging. A user can only gain access to the resources of the system 400 by using one of the computers 404 through 408 which incorporates the interface program 302 and which recognizes the user's identification. In an alternative embodiment, the system 400 is part of a larger network, and authorized users of the larger network have access to resources such as disk space, memory and processor cycles on the computers 404 through 412 by means other than the interface program 302. However, users of the larger network do not have access to messages, configuration parameters, or other resources that relate only to the system 400, except through the interface program 302. These restrictions are enforced by user permissions, access control lists, encryption, and/or similar means.

The interface program 302 may have only limited addressing information, such as the location of the conveying program 308 to which the paired destination and data specification will be sent. The conveying program 308 resolves all addressing in order to (a) deliver the data specification to the addressed destination, and/or (b) relay the paired destination and data specification to one or more other instances of the conveying program 308.

A data specification repository 416 contains the user data (the messages) being conveyed from one user to another, and/or pointers to copies of the data that reside outside the computer system 408 (and/or 410) that holds the repository 416. In one embodiment, the data specification repository 416 is centralized, being stored at a master physical location until accessed. In this embodiment, the data specification is physically moved to the repository 416 for temporary storage until the message is finally delivered; an archive copy may be maintained at the repository 416 site even after delivery.

In another embodiment, the data specification repository 416 is virtual in that the data specification comprises addressing information required to access the user data, and the repository 416 contains this addressing information. In such an embodiment, the data specification includes addressing information such as file addressing information. In yet another implementation, the data specification repository 416 is dedicated to the computer which contains the repository 416, and the interface program 302 specifies message data by specifying an address which allows the conveying program 308 to access the data. Those of skill in the art will appreciate that the data specification repository 416 may be implemented as a combination of these specified embodiments or as a variation thereof, such as through replication.

With continued reference to FIG. 4, the computer 404 includes the interface program 302, conveying program 308, and network access module 414. The messages entered on this computer 404 through the interface program 302 for transmission will be sent to the instance of the conveying program 308 that is executing on this computer 404. Upon address resolution, use of the network access module 414 may or may not be necessary, depending on the resolved address. In general, the computer 404 may send paired destination and data specifications both to itself and to other computers in the system 400.

By contrast, the computer 406 includes only an instance of the interface program 302 and the network access module 414. No conveying program 308 is present on the computer 406. As a result, all messages entered by users on this computer 406 will have to be sent initially to a conveying program 308 known to the interface program 302, such as the conveying program 308 on one or more of the computers 404, 408, and 412.

The computer 408 incorporates the interface program 302, conveying program 308, data specification repository 416, and network access module 414. In addition to the capabilities of computer 404 specified above, this computer 408 accordingly provides access to the repository 416, both for itself and for other computers in the system 400.

The computer 410 includes the data specification repository 416 and network access module 414. The absence of any interface program on the computer 410 prevents user access to the system 400 through this computer 410. Furthermore, the absence of a conveying program makes this computer 410 incapable of resolving addresses for delivery of paired destination and data specifications. However, other computers in the system 400 may communicate with this computer 410 through the access module 414 to access the data specification repository 416 stored on this computer 410.

The computer 412 incorporates the conveying program 308 and network access module 414. Similar to computer 410, a user cannot access the system 400 through this computer 412 because of the absence of an interface program 302. But this computer 412 can assist delivery of the paired destination and data specifications which were initiated by other computers in the system 400.

Of course, the examples shown in FIG. 4 do not exhaust the possibilities. Those of skill in the art will appreciate that while some form of network access module 414 needs to be incorporated into each computer connected to the network 402, the interface program 302, conveying program 308, and data specification repository 416 may or may not be incorporated in a given computer, and that each computer may incorporate one or more of these components.

One embodiment of the system 400 saves data which has been entered but not yet sent, such that if the interface program 302 terminates abnormally, the data can be sent after the interface program 302 is restarted. This may be accomplished by buffering data locally or remotely in a non-volatile buffer. The buffering may be performed by the gathering program 304, the shell program 306, the conveying program 308, and/or the data repository 416.

FIG. 4 provides one example of a peer-to-peer network configured according to the invention. In a client-server network, the conveying program 308 may be incorporated into one or more servers. The data specification repository 416 may be incorporated into one or more servers or into individual clients. The user identification routines and internal administrative data may be contained in one or more servers, enabling the potential user to access the system at any client node. Furthermore, a single computer can function as both a client and a server.

In preferred embodiments, the shell program 306 (FIG. 3) is an important component of the interface program 302. The shell 306 provides various combinations of functionality in different embodiments of the invention. In particular, the shell program 306 preferably gives the interface program 302 substantially exclusive control of the computer on which the interface 302 runs. Substantially exclusive control of a computer is provided by prohibiting users from gaining direct unconstrained access to underlying computer resources such as the operating system, file system, boot software, network operating system, and disk drives, memory, or other storage devices. This protects the resources from inadvertent or malicious operations that might reveal, corrupt, or destroy sensitive user data, system configurations, or administration data such as permissions or access logs. The user's only access to system resources is through the options made available by the gathering program 304. Only an authorized administrator, or a determined user who understands technical system details, can gain direct resource access.

Conventional application shells or application programs may restrict access to the underlying computer resources but do not have substantially exclusive control of the computer.

Figure 5:
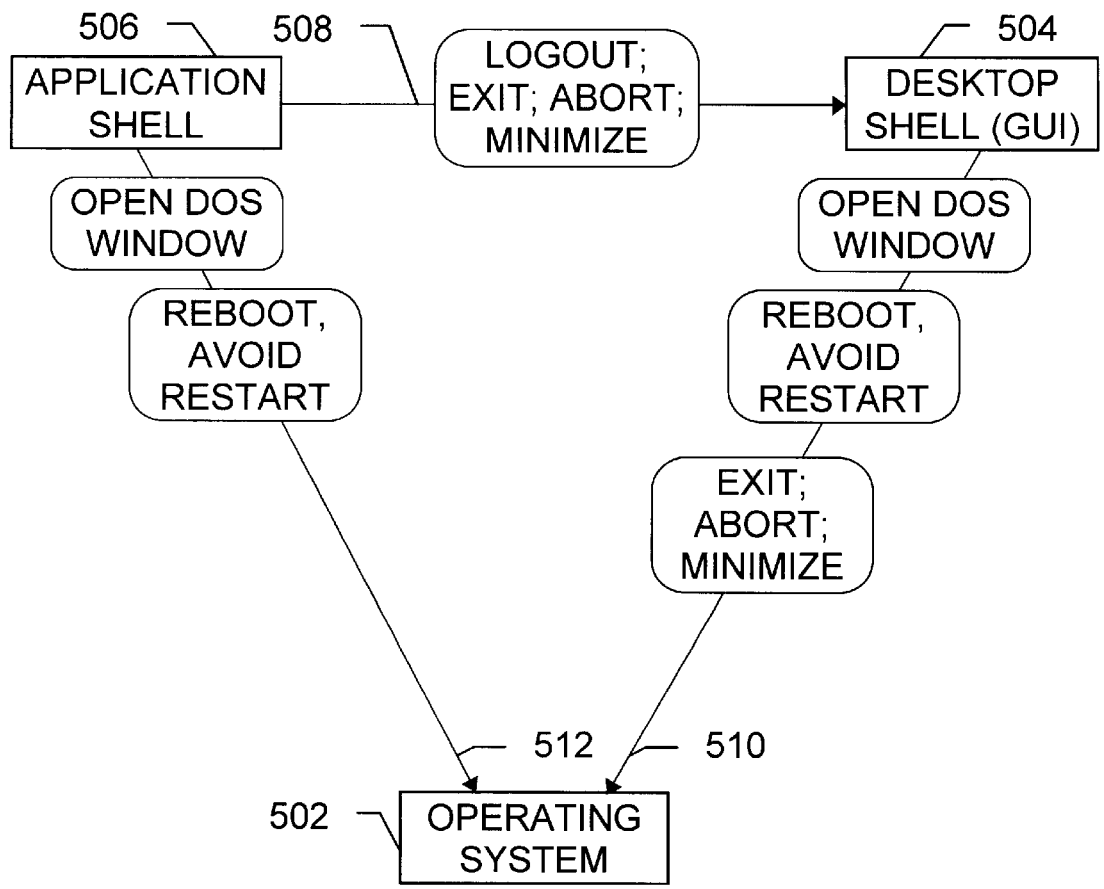
FIG. 5 is a diagram illustrating possible state transitions in a conventional application shell or application program.

FIG. 5 shows selected state transitions in one such conventional system. An operating system 502 starts a desktop shell or graphical user interface (GUI) 504 which, upon identifying a user, starts an application shell 506 (some GUIs 504 do not require user identification before starting the application 506). The application shell 506 is a user interface which has been customized for this particular user, thus restricting the operations the user can perform on the computer. But the application shell 506 fails to protect the underlying computer resources because it does not prohibit a user from bypassing the shell 506.

For example, assume the operating system 502 is a version of the widely used DOS operating system, the desktop shell 504 is a Windows 95 shell, and the application shell 506 is an application program or other process invoked from the desktop shell 504. Even if the computer is configured to automatically run the GUI 504 and then run the application 506 after booting, a user can access the GUI 504 (thereby gaining access to undesirable options) by logging out of the application 506 or by terminating the application 506. Such transitions from the application 506 to the GUI 504 are indicated by labeled arrow 508.

Even if the GUI 504 restricts operations, the user may then gain access to the operating system 502 by exiting or collapsing the GUI 504, as indicated by labeled arrow 510. It is also possible to gain access to the operating system 502 by opening a DOS window, as indicated by the labeled arrows 510, 512, either with or without exiting the application shell 506. As indicated by the labeled arrows 510, 512, the computer may also be rebooted and the reboot process may be modified or interrupted so that the application shell 506 and/or the GUI 504 is not automatically restarted, thereby leaving the user at the GUI 504 or operating system 502 level.

Figure 6:
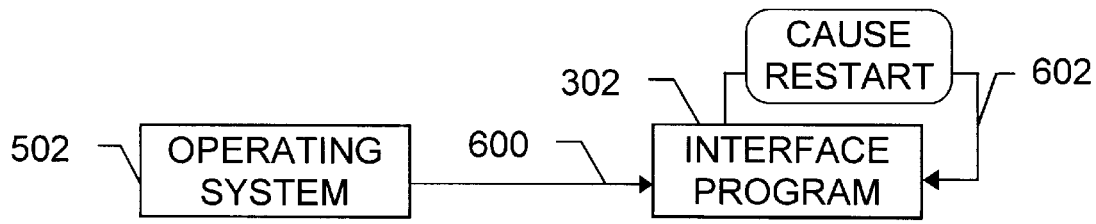
FIG. 6 is a diagram illustrating state transitions of the present invention.

In contrast, FIG. 6 shows state transitions in a computer configured according to the present invention. An expected transition in control from the operating system 502 to the interface program 302 is indicated by the arrow 600. A knowledgeable user could attempt to gain unauthorized access by interrupting or modifying the boot (or reboot) process. For instance, such a user might try to prevent the transition 600 from occurring, which could prevent the interface program 302 from maintaining substantially exclusive control of the computer.

However, in one embodiment of the invention the server 204 or another computer regularly polls each computer which is expected to be running the interface program 302 to verify, through a "heartbeat" or other acknowledgment, that the interface program 302 is actually running. If it is not running, then measures may be taken. Suitable measures include attempting to restart the interface program 302 remotely, notifying an administrator, activating access control locks or encryption devices to protect data, issuing a warning message, disabling part or all of the system 100 or 400, or a combination of such steps.

In addition, if the shell 306 portion of the interface program 302 has been activated, it may take measures such as automatically starting (or restarting) the gathering program 304, or other measures such as those taken in response to a missing "heartbeat." Automatic restarts, whether caused by a shell 306 running locally, or by a shell 306 or another program running remotely, are indicated by the labeled arrow 602 in FIG. 6.

Figure 7:
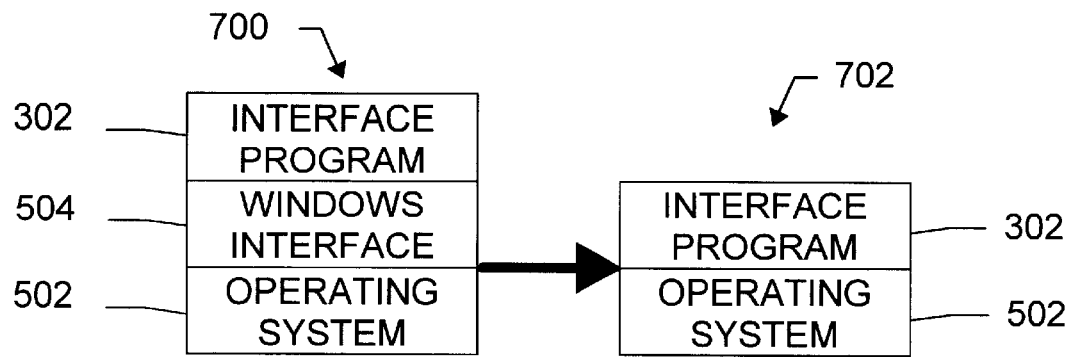
FIG. 7 is a diagram illustrating one possible method by which the interface program is given substantially exclusive control of the computer.

The interface program 302 may be given substantially exclusive control of a computer in various ways. FIG. 7 depicts an embodiment in which the interface program 302 physically takes control from the Windows 95 desktop 504. An initial state 700 in such an implementation is reached after the operating system 502 starts the Windows 95 interface 504. From the Windows 95 interface 504, a user or agent initiates execution of the interface program 302. This results in a system state 702 in which it has become impossible to return directly to the Windows 95 interface 504 from the interface program 302. Furthermore, as discussed elsewhere herein, the user does not have direct access to the operating system 502 once the interface program 302 begins running.

Figure 8:
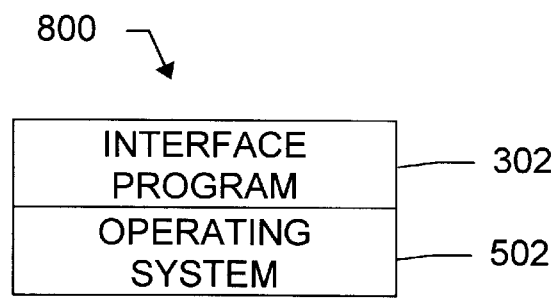
FIG. 8 is a diagram illustrating another possible method by which the interface program is given substantially exclusive control of the computer.

FIG. 8 depicts another embodiment, in which the interface program 302 replaces the desktop shell 504 right from boot-up, instead of taking over from the shell 504 as shown in FIG. 7. The operating system 502 starts the interface program 302 instead of starting the desktop shell 504. Once the interface program 302 starts, it has substantially exclusive control over access to resources, including disks, ports, and connections. The methods shown in FIGS. 7 and 8 are complementary to, not exclusive of, the measures discussed above in connection with FIG. 6.

Regardless of how the shell program 306 originally obtains substantially exclusive control, the shell 306 protects the underlying computer resources from inadvertent or malicious access by a user. The shell program 306 initially starts the gathering program 304 and continuously monitors the system to ensure that the gathering program 304 is not terminated abnormally. If and when the gathering program 304 is terminated abnormally, such as by the user entering Ctrl-Alt-Del to kill the process, the shell program 306 will continue to inhibit user access to the system resources. This may be accomplished in numerous ways, including immediately initiating the login process and/or restarting the gathering program 304.

The interface program 302 allows administration of machines in the systems 100 and 400, preferably supporting both local and remote administration. Through a protected shell option, an authorized system administrator can access configuration data such as permissions and accounts. The administrator can also control the versions of software being used.

Additionally, the interface program 302 may accept commands from an administrator to shutdown or reboot. Commands may be entered through a keyboard, or by other means, including having the interface program 302 periodically monitor a file for a specific command entry. This file can be either local or remote, and the administrator can make the proper entry either locally or remotely over the network 210.

The interface program 302 also regularly transmits its status or another indication that the program 302 is actively executing on the computer. This finction may be implemented in various ways including sending a periodic "heartbeat" to a designated process on a designated node on the network 210 or 402. In the absence of a network, the interface program 302 may send the periodic "heartbeat" to a designated process on the same machine the interface program 302 is running on.

The designated process will take appropriate action, including performing a shutdown or a restart, upon failure to receive the expected "heartbeat." If a designated node is used, that node will have knowledge of the nodes from which it expects periodic "heartbeats," and upon failure to receive a "heartbeat" the designated process can take various actions including notifying an administrator or initiating a shutdown command to the remote node.

Software revision updates and compatibility enforcement are performed by having the interface program 302 and the conveying program 308 cooperate to automatically download and install necessary programs over the network 210. Both downloading and installation may be performed without the need for user intervention. One method of performing this function is to have the computer periodically monitor designated network nodes to determine if certain prespecified files have later time stamps and to download the newer versions of such files. The actual installation may be accomplished by having the interface program 302 monitor the local system to install the files when the local system is not being used. Those of skill in the art will appreciate that there exist variations which will provide the necessary functionality.

In summary, the present invention uses a simple, easy-to-use user interface for the underlying email system to provide naive users the capability to exchange messages with other users of the same or compatible email systems. In one or more embodiments, the interface screen presented to the user may include colored buttons that match colored keys on the keyboard. Other buttons on the interface screen may be depicted as distinct shapes which match shapes on the keyboard. A minimal number of options is presented. This and other features enable use of the system without previous computer or product training. Because the present invention provides messaging capabilities to the novice user, the invention also protects the underlying system resources from possible inadvertent operations. The user only has access to the functions presented in the user interface of this invention (for example, read mail, send mail, view the address book), and any attempts at accessing underlying system services, whether accidental or malicious, is not permitted. As a result, this invention presents a messaging system for use by the "computer-adverse" user while at the same time securing the sensitive information stored on the computer from these and other users.

Those of skill in the art will also recognize that an embodiment of the present invention need not include all parts of the architecture described above. The invention may be embodied in other specific forms without departing from its spirit or essential aspects. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computing system for transferring messages between users, the system including:

at least a first computer; and an interface program running on the first computer, the interface program capable of accepting input from a user, the input including at least a paired destination and data specification, the data specification containing message contents and/or identifying the location of message contents, the destination specifying at least one of a user and an archive to receive a copy of the message contents, the interface program also capable of sending the paired destination and data specification to a conveying program, the interface program also capable of receiving a data specification from the conveying program, and the interface program having substantially exclusive control of the first computer the substantially exclusive control prohibiting users from gaining direct unconstrained access to undering computer resources such as an operating system file system boot software, network operating system, and disk drives, memory, or other storage devices, whereas an authorized administrator, or a determined user who understands technical system details, can gain direct resource access;

wherein the conveying program is capable of receiving the paired destination and data specification, and capable of sending the data specification toward the destination.

2. The system of claim 1, further comprising at least one additional computer and the conveying program, the first computer capable of being connected in signal communication by a connection with the additional computer, in which:

the conveying program runs on the additional computer;

the interface program is capable of sending the paired destination and data specification over the connection, and receiving a data specification over the connection; and the conveying program is capable of receiving the paired destination and data specification over the connection, determining the computer identified by the destination, and sending the data specification over the connection.

3. The system of claim 2, further comprising at least one data specification repository, wherein the interface program and the conveying program are capable of transferring the data specification using the repository.

4. The system of claim 1, in which the interface program includes a shell program that controls access to the first computer by the user to help give the interface program substantially exclusive control of the first computer, and a gathering program that accepts the input from the user, gathers messages from users, and displays messages to users.

5. The system of claim 4, in which the gathering program includes a naive user interface comprising buttons on the computer screen and matching keys on a computer keyboard.

6. The system of claim 5, wherein the buttons on the screen match the keys in color.

7. The system of claim 4, in which the shell program automatically starts the gathering program when the computer is first booted and automatically restarts the gathering program if the gathering program ever terminates abnormally.

8. The system of claim 4, wherein the shell program is substantially free of user options and preferences whose settings change the behavior of another feature.

9. The system of claim 1, in which the interface program gains substantially exclusive control of the first computer at least in part by taking control of a Windows desktop.

10. The system of claim 1, in which the interface program replaces a Windows desktop.

11. The system of claim 2, in which the interface program and the conveying program cooperate to download and install program updates on the first computer.

12. The system of claim 11, in which the updates are installed without notifying the user and without requesting the user's consent.

13. The system of claim 2, in which the interface program regularly sends a heartbeat signal to the conveying program, and the conveying program notifies an administrator if an expected heartbeat signal is not received.

14. The system of claim 1, in which the system saves a data specification which has been entered but not yet sent, the data specification containing message contents and/or identifying the location of message contents, such that if the interface program terminates abnormally, the data specification can be sent after the interface program is restarted.

15. A computer-assisted messaging method for transferring messages between users, comprising the steps of:

on a computer, providing an interface program which presents a messaging user interface tailored for use by naive users the interface program capable of accepting input from a user, the input including at least a paired destination and data specification, the data specification containing message contents and/or identifying the location of message contents, the destination specifying at least one of a user and an archive to receive a copy of the message contents the interface program also capable of sending the paired destination and data specification to a conveying program the interface program also capable of receiving a data specification from the conveying program, the conveying program capable of receiving the paired destination and data specification, and capable of sending the data specification toward the destination; and limiting access to resources by gaining and maintaining substantially exclusive control of the computer by the interface program, the substantially exclusive control prohibiting users from gaining direct unconstrained access to underlying computer resources such as an operating system, file system, boot software, network operating system, and disk drives, memory, or other storage devices, whereas an authorized administrator, or a determined user who understands technical system details, can gain direct resource access.

16. The method of claim 15, wherein the providing step presents a user interface containing display buttons which match physical buttons.

17. The method of claim 16, wherein the display buttons and the physical buttons match in color.

18. The method of claim 16, wherein the display buttons and the physical buttons match in shape.

19. The method of claim 16, wherein the display buttons and the physical buttons match in design.

20. The method of claim 15, wherein the limiting step maintains substantially exclusive control of the computer by automatically restarting at least a portion of the interface program when that portion is terminated by a user.

21. The method of claim 20, wherein the restarting step occurs in response to a failure to receive a heartbeat or acknowledgment from the terminated portion.

22. The method of claim 21, wherein the expected heartbeat or acknowledgment is transmitted over a network connection prior to termination of the terminated portion.

23. The method of claim 15, further comprising the step of using the interface program to download and install program updates on the computer.

24. The method of claim 23, in which the updates are installed without notifying the user and without requesting the user's consent.

25. A computer storage medium having a configuration that represents data and instructions which will cause at least a portion of a computer system to perform method steps for messaging, the method steps comprising the steps of:

on a computer, providing an interface program which presents a messaging user interface tailored for use by naive users, the interface program capable of accepting input from a user, the input including at least a paired destination and data specification, the data specification containing message contents and/or identifying the location of message contents, the destination specifying at least one of a user and an archive to receive a copy of the message contents, the interface program also capable of sending the paired destination and data specification to a conveying program. the interface program also capable of receiving a data specification from the conveying program, the conveying program capable of receiving the paired destination and data specification, and capable of sending the data specification toward the destination; and limiting access to resources by gaining and maintaining substantially exclusive control of the computer by the interface program, the substantially exclusive control prohibiting users from gaining direct unconstrained access to underlying computer resources such as an operating system. file system, boot software, network operating system, and disk drives, memory, or other storage devices, whereas an authorized administrator, or a determined user who understands technical system details, can pain direct resource access.

26. The storage medium of claim 25, wherein the providing step presents a user interface containing display buttons which match physical buttons, and the display buttons and the physical buttons match in color.

27. The storage medium of claim 25, wherein the limiting step maintains substantially exclusive control of the computer by automatically restarting at least a portion of the interface program when that portion is terminated by a user.

28. The storage medium of claim 27, wherein the restarting step occurs in response to a failure to receive a heartbeat or acknowledgment from the terminated portion.

29. The storage medium of claim 25, wherein the method steps further comprise the step of using the interface program to download and install program updates on the computer.

* * * * *